M. G. HUBBARD.
Grain and Grass Harvester.

No. 13,004.　　　　　　　　　　　　Patented June 5, 1855.

M. G. Hubbard

UNITED STATES PATENT OFFICE.

M. G. HUBBARD, OF NEW YORK, N. Y.

IMPROVEMENT IN GRAIN AND GRASS HARVESTERS.

Specification forming part of Letters Patent No. 13,004, dated June 5, 1855.

*To all whom it may concern:*

Be it known that I, M. G. HUBBARD, of the city, county, and State of New York, have invented certain new and useful Improvements in Mowing and Reaping Machines; and I do hereby declare the following to be a full, clear, and exact description thereof, reference being had to the accompanying drawings, in which—

Figure 1:
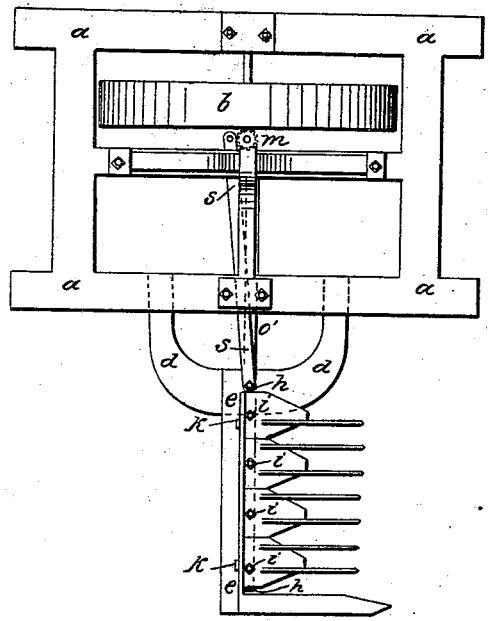
Figure 2:
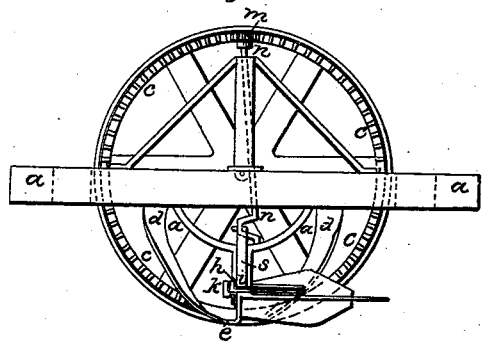
Figure 3:
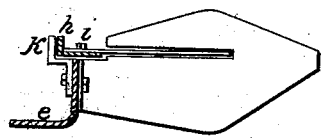

Figure 1 is a top plan; Fig. 2, a side elevation; Fig. 3, detached portions.

The same letters are used in all the figures to designate like parts.

My improvements consist in the direct connection between the driving-wheel and cutters by means of a single shaft; the combination and bracing of the driving parts with the frame, and the mode of forming the cutter-bar and affixing the cutters thereto, together with the form and construction of the finger-bar and its connection with the frame.

The construction is as follows: An oblong frame, $a$, composed of three longitudinal side rails, connected in front and rear by two cross-rails, is supported on the revolving axle of a driving-wheel, $b$, having a broad tread, and with long bearings of the axle in the frame. On the inside of the rim of this wheel $b$ there is a cog-gearing, $c$, formed in segments or otherwise and attached to the rim in any convenient way. To the right-hand side rail two curved bracing-pieces, $d$, are bolted, which turn down and meet at the surface of the ground, where they unite and form a runner to slide over the ground as the machine is drawn forward. To these braces $d$ the finger-bar $e$ is bolted. This bar is an angle-iron. (Shown in cross-section, Fig. 3.) The front portion being perpendicular, the fingers are bolted onto it, so as to be easily detached and replaced if injured by removing the bed on which the cutter-bar usually slides, and other causes of clogging. I am enabled to insert in this arrangement two fingers to each cutter, by which I effect an important improvement, cutting twice at each revolution of the crank without giving the cutter-bar a greater motion than the breadth of the cutter; and by the greater number of fingers in a given space I more perfectly protect the cutters from stones and other obstacles which serve to dull the knives. The cutter-bar $h$ must necessarily be made strong and stiff for the purpose, and should be as light as is consistent with those requirements; and as it is desirable to have each of the cutters removable easily, I have devised my new form of bar and mode of attaching and detaching each cutter separately and with facility. For this purpose I make the bar also an angle-iron, the back of it being bent up at right angles. (See Fig. 3.) Against this back elevation the cutters abut, and are held steady by a single bolt or screw passing through them at $i$, so as to be readily removed when accidentally injured or require sharpening. The bar $e$ is held in place by lugs $k$, affixed to the perpendicular portion of the finger-bar. There is a small pinion, $m$, that plays into the gearing on the driving-wheel at the top. This pinion is on the upper end of a shaft, $n$, which extends downward sufficiently inclined to clear the axle of the driving-wheel. Near the lower end of this shaft there is a sunk crank, and its lower end rests in a step formed in an iron brace, $o$, affixed to the middle rail of frame $a$. A brace-bar, $o'$, extends from the step to the nearest end of the finger-bar, where it is affixed and steadied. The parts under the action of the driving-power, the upper end of the shaft $n$, is sustained by a bearing raised from the middle rail of the frame $a$ and braced by a connection upon the right-hand rail. A shackle-bar, S, extends from the inner end of the cutter-bar to the crank on shaft $n$, which, by its revolution, thus communicates a vibrating motion to the cutter-bar, thus effecting a direct and efficient action from the driving-point to the working-point by a simple and substantive mechanism, easily adjusted and kept in repair.

Having thus fully described my improved mowing and reaping machinery, what I claim therein as new, and desire to secure by Letters Patent, is—

1. The employment of two fingers to each knife or sickle blade for the purpose of dividing the cutting force expended at each stroke of the cutter-bar, and also preserving more perfectly the cutters from injury by keeping stones, &c., from coming in contact therewith.

2. I do not claim the general device of making bars of angle-iron for the purpose of lightness and rigidity, but the making the cutter-bar of angle-iron for the purpose of attaining at the same time both the above advantages and a shoulder against which to abut the knives, so that a single bolt to each will securely hold them, substantially as and for the purpose above set forth and described.

M. G. HUBBARD.

Witnesses:
J. J. GREENOUGH,
WM. GREENOUGH.